United States Patent
Wineberg et al.

(10) Patent No.: US 6,310,951 B1
(45) Date of Patent: Oct. 30, 2001

(54) REASSIGNMENT OF AGENTS

(75) Inventors: Jonathan M. Wineberg, Leesburg; Neil D. Pundit, Herndon; Arunachalam Ravichandran, Centreville, all of VA (US)

(73) Assignee: SER Solutions, Inc., Herndon, VA (US)

( * ) Notice: Subject to any disclaimer, the term of this patent is extended or adjusted under 35 U.S.C. 154(b) by 0 days.

(21) Appl. No.: 09/160,047

(22) Filed: Sep. 25, 1998

(51) Int. Cl.$^7$ .................................................... H04M 3/00
(52) U.S. Cl. ........................ 379/265; 379/269; 379/309; 705/11
(58) Field of Search ................................. 379/201, 265, 379/266, 269, 309; 705/11

(56) References Cited

U.S. PATENT DOCUMENTS

| | | | |
|---|---|---|---|
| 5,239,460 | * | 8/1993 | LaRoche ................................ 705/11 |
| 5,299,260 | * | 3/1994 | Shaio ................................... 379/265 |
| 5,594,791 | * | 1/1997 | Szlam et al. ........................... 379/265 |
| 5,784,452 | * | 7/1998 | Carney ................................. 379/265 |
| 5,825,869 | * | 10/1998 | Brooks et al. ........................ 379/265 |
| 5,903,641 | * | 5/1999 | Tonisson .............................. 379/266 |
| 5,946,375 | * | 8/1999 | Pattison et al. ........................ 379/34 |
| 6,038,544 | * | 3/2000 | Machin et al. ......................... 705/11 |
| 6,049,779 | * | 4/2000 | Berkson ................................. 705/14 |

* cited by examiner

Primary Examiner—Ahmad Matar
Assistant Examiner—Bing Bui
(74) Attorney, Agent, or Firm—Andrew C. Aitken; Venable

(57) ABSTRACT

A process for reassignment of agents based on their performance in the last performance interval; if the performance of an agent is superior, then he/she is moved to a higher campaign. "Higher" refers to a campaign for which the call center receives a greater remuneration whether or not the call center in turn increases the rate of pay of the agent. Similarly, if the performance is inferior, then the agent is moved to a lower campaign, i.e., one for which the call center receives less remuneration. If the performance just meets the objective, then the agent's assignment stays the same. There can be many levels of superior or inferior performance but the basic principle remains the same.

7 Claims, 4 Drawing Sheets

Reassignment Process Summary

Reassignment Process Summary

Determination of Assignment

FIG.3 Assigning Up

Assigning Down

REASSIGNMENT OF AGENTS

BACKGROUND OF THE INVENTION

1. Field of the Invention

This invention relates to a computer-automated process for periodic reassignment of agents to campaigns in a call center based on a determination of an agent's recent performance. In particular, the process takes into account the staffing requirement of campaigns, and other campaign specifications such as a daily limit on overall reassignments, a maximum number of reassignments per agent, a minimum number of consecutive agent performance results, provision for disabling either upward or downward reassignment, maximum number of campaigns that can be skipped in the reassignment; and other user-specified criteria.

2. Description of the Prior Art

As will be appreciated by those skilled in the art, a call center employs automatic call distributor systems to direct inbound calls to agents and/or outbound predictive dialing systems to place calls and connect agents to coupled calls.

Currently, there is no systematic procedure for reassignment of agents in a call center. Initial assignment is usually done by taking into account the skill and the past performance of the agents. But once the agent is assigned to a campaign (inbound or outbound) any change to the assignment is not evaluated or accomplished by an automated routine. A supervisor may manually reassign the agent to a different campaign based on needs of the campaign or needs of the agent but there is no process for periodic evaluation and reassignment of agents based on performance.

Agent labor cost in a call center is in excess of 50% of the total cost. The agent turnover rate is very high but can be lowered by an increase in agent motivation. There is a wide range of variation in the rate at which the call center bills for different campaigns. The performance of the agent varies with the time of the day, the nature of campaign, the degree of fatigue, and the like. If the performance of an agent would be enhanced by a change in his/her assignment, then it would be a win-win opportunity because a more productive assignment would improve the overall performance of the campaign and hence that of the call center.

SUMMARY OF THE INVENTION

An object of this invention is the process for periodic reassignment of agents based on their performance over a preceding performance-interval, where the interval is chosen by the call center.

Another object of the invention is to satisfy a number of possible constraints on staffing of a campaign, conditions on reassignment of agents, provision for disabling upward or downward reassignment, and provision for introducing additional criteria for reassignment.

A third object of the invention is a reassignment process that is applicable regardless of the number and the characteristics of campaigns. Characteristics include inbound and outbound, and the objective of the campaign.

A final objective of the invention is its applicability to other industries employing a large number of workers on an hourly basis for a variety of assignments.

Briefly, this invention contemplates a process for reassignment of agents based on their performance in the last performance-interval. If the performance of an agent is superior, then he/she is moved to a higher campaign. "Higher" refers to a campaign for which the call center receives a greater remuneration whether or not the call center in turn increases the rate of pay of the agent. Similarly, if the performance is inferior, then the agent is moved to a lower campaign, i.e., one for which the call center receives less remuneration. If the performance just meets the objective, then the agent's assignment stays the same. There can be many levels of superior or inferior performance but the basic principle remains the same.

BRIEF DESCRIPTION OF THE DRAWINGS

The foregoing and other objects, aspects and advantages will be better understood from the following detailed description of a preferred embodiment of the invention, in which:

FIG. 1 is a simplified flow diagram of the Reassignment Process in which performance of all agents is updated periodically and reassignments are done as appropriate so long as there is at least one other campaign for agents to be reassigned to.

DETAILED DESCRIPTION OF A PREFERRED EMBODIMENT

Figure 1:
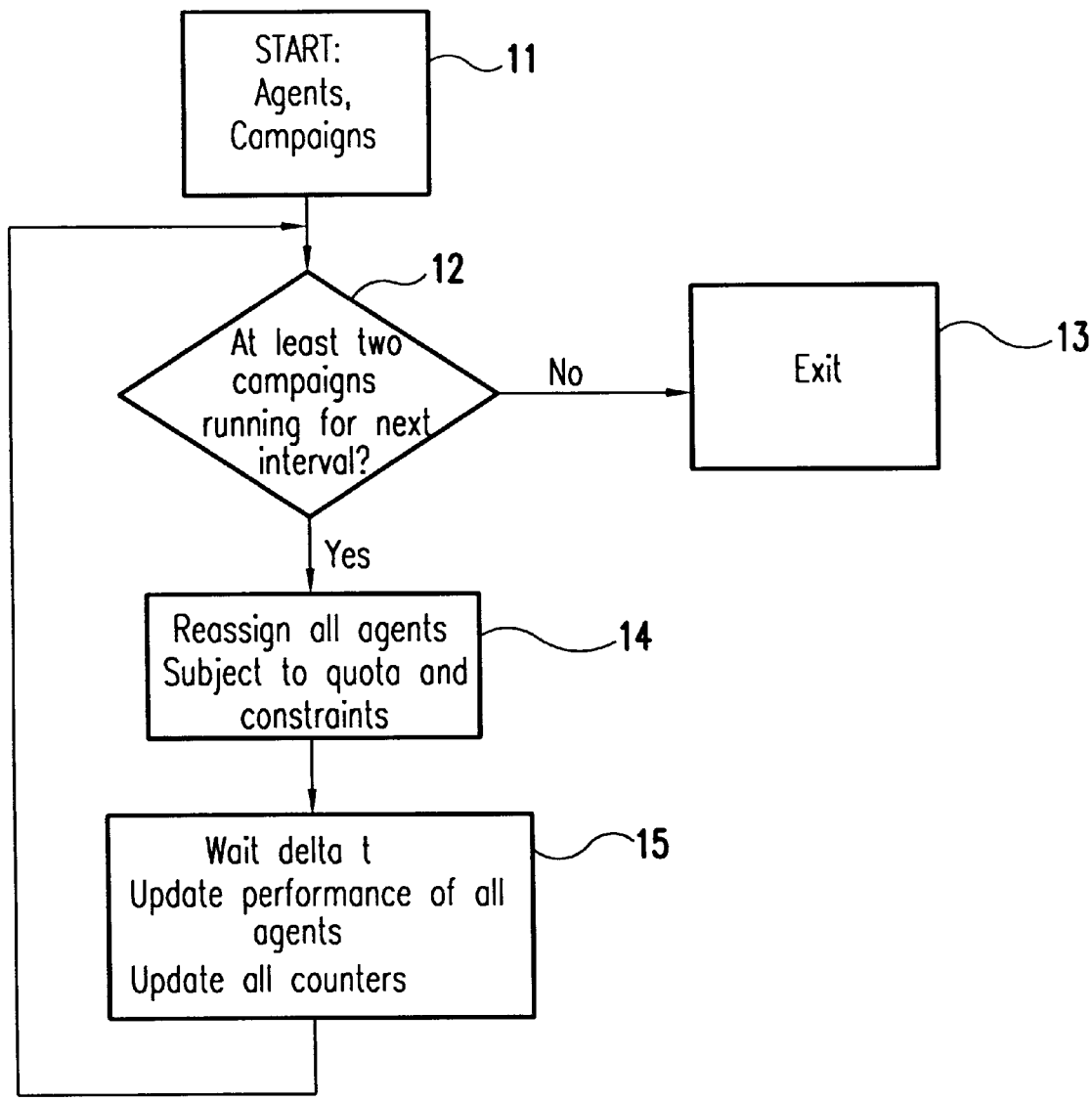

Before describing a preferred embodiment, it is helpful to state the current practices in a typical call center. A center may have a number of inbound and of outbound campaigns. The revenue that a call center receives is dependent on a number of factors, which include success in achieving the goal of a campaign. There may be a number of inbound and outbound campaigns running simultaneously. Typical campaigns on inbound include customers ordering merchandise from a catalog, making travel reservations, asking help for a problem, or simply expressing an opinion in a survey. Typical campaigns on outbound include credit collection, product promotion, taking orders, fund-raising for a charitable cause, and opinion surveys. Since the goal of a campaign is specific, for each campaign, metrics for measuring success are defined by the campaign's sponsor along with call center compensation and bonus. The scheme for determining the bonus can be quite complicated, and for the sake of simplicity of presentation, it is assumed that the rate of compensation is dependent on how well the goal of the campaign is met. The overall performance of a campaign is made up of the performance of the agents assigned to the campaign. The rate of compensation of agent is based on performance.

Each campaign may need a different set of skills from agents. Reassignment of agents can be made between campaigns requiring similar skill sets.

Each call center has a pool of agents of varying skills. While an agent's past performance over a long period of time may be known and used for the initial assignment, the actual performance during any workday may vary widely depending on the nature of the assignment and the state of body and mind of the agent. The supervisor determines the performance of the agents. Alternatively, the supervisor may automate the process of performance evaluation which may vary with campaign. The center may have supervisors update the performance of the agents periodically, say, every 30 minutes.

For simplicity of exposition of the basic elements of the invention, let us suppose that performance is measured in 3 categories, namely, superior, satisfactory, and inferior, with their corresponding numerical values of 1.1, 1.0, and 0.9, respectively. Assume a basic rate of compensation is $10 per hour with a 10% addition for superior performance, and 10% decrease for inferior performance. If the updated performance of the agent is superior, then he/she may be reassigned to a campaign with a basic rate of $11 per hour with plus and minus 10% variation. In this case the agent has a potential of making $12.10 per hour by maintaining superior performance. And, even if the performance deteriorates to satisfactory, then the agent would still make $11 per hour. Now, consider an agent whose performance is inferior on the $10 per hour campaign in which case the agent makes only $9 per hour. The agent may be reassigned to a campaign with a basic rate of $9 per hour. This reassignment is made under the expectation that the less demanding campaign provides the agent a chance of boosting the performance to satisfactory with the same compensation, and the additional potential of increasing the performance to superior in which case the agent would make $9.90 per hour. There is a small risk that the performance will continue to be inferior, in which case he would get only $8.10 per hour. There may be other policy or practical considerations against the lower assignment in which case the center can opt against it. The basic idea behind the reassignment is to provide an opportunity to the agent for better compensation based on performance, whereby both the agents and the center can benefit. And, if the performance is inferior, then the agent is reassigned to a less demanding (and a less paying) campaign to enable the agent to enhance performance. The goal is improvement in the call center campaign performance through improved agent performance and compensation. In some centers, the rate of payment of the agent may remain fixed for the day. But even in this case, the reassignment process tends to boost the performance of the agent, which in the aggregate makes the center's performance better.

Referring to a preferred embodiment of the invention, FIG. 1 is a conceptual summary of all major steps in the process of reassignment of agents. Block 11 enables the start of the process by forming a data base record of details of all agents and the campaigns to which they are assigned. Decision block 12 checks to determine that there will be at least two campaigns running in the next period such that agents can be reassigned from one campaign to the other. If not, the reassignment process terminates in block 13 marked exit. If at least two campaigns are running, then the agent reassignment process continues based on recent agent performance data and quota and constraint inputted by the call center, block 14. Quota is a maximum number of reassignments over a prescribed interval (e.g., 24 hours), if there be such a limit. For example, for a call center with 1000 agents, it may be desirable to limit the number of reassignments to 200 such that only 20% of the workforce is affected. However, if there is no limit, then the quota can be assigned a high number. Similarly, constraint inputs can specify the maximum number of times an agent may be reassigned, the minimum number of consecutive performance results before a reassignment can be considered, whether upward and downward reassignments are allowable, and the maximum number of campaigns that can be skipped in the process of making a reassignment. In any case, when all agents are duly considered, the process waits for a period (delta t) to collect and update performance of the agents, and to update the applicable counters, block 15. The flow then goes back to decision block 12, which is described earlier.

Figure 2:
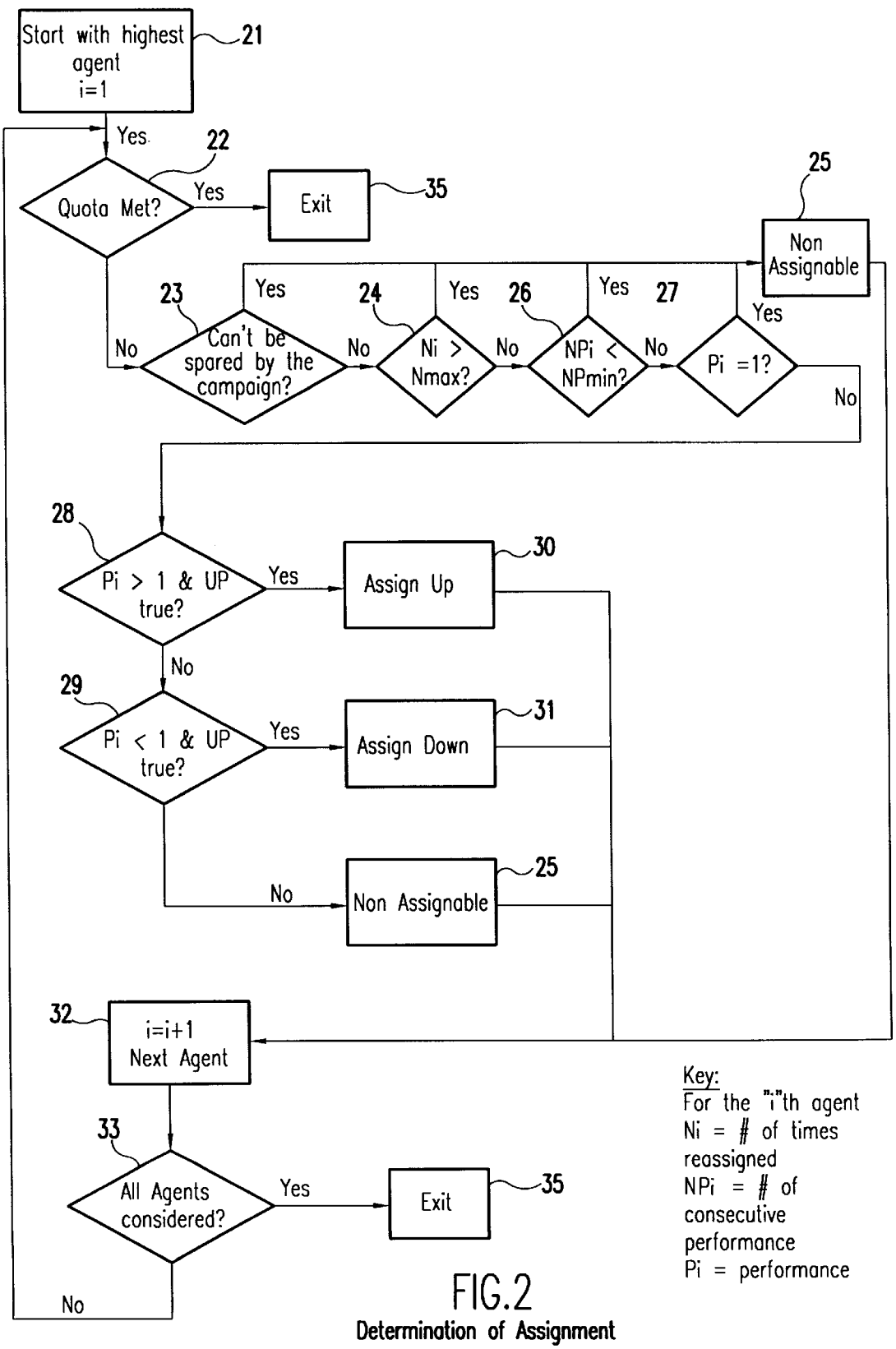
FIG. 2 is a flow diagram showing for each agent the detailed logic for determining when and how the reassignment is to be made.

FIG. 2 depicts the flow diagram of the subprocess of determining if reassignment can be done for a particular agent, and if so then whether it should be upward or downward. It starts with block 21 in which Quota, Nmax, NPmin, and logical variables UP and DOWN are specified. Nmax is the maximum number of reassignments for any agent for the day—whose theoretical value would be the total of day's working hours divided by the period needed for reevaluating performance. For a 15-hour day with a half-hour needed for re-evaluation, Nmax would be 30. However, Nmax can be set to any lower value, say, 5.

NPmin is the minimum number of intervals of consecutive equal performance for an agent as a condition for reassignment. For example, one could require that superior performance be repeated a number of times consecutively before a reassignment is made. Typically, NPmin would be 2 or more but 1 is allowable as well in which case no repetition of the same performance would be required. The logical variables UP and DOWN, when true, allow consideration of reassignment respectively upward or downward. If their value is false, then reassignment is disallowed respectively for upward or downward. For example, a call center may disallow any downward assignment by setting DOWN as false.

In Block 21 we start with the highest paid agent, arranged in descending order of agent pay. However, in another embodiment the order can be ascending. Depending on the choice of the call center, one could start either with the highest paid or the lowest paid agent if the reassignments are limited by Quota and Nmax. Decision block 22 determines if Quota is met in which case the process exits, block 35. If Quota is not met then decision block 23 determines if this agent can be spared by the campaign. For example, the agent may be critically needed by the campaign for skill reasons or the campaign staffing may be at its absolute minimum. In any case, if the agent can not be spared, then the agent is nonassignable, block 25. Otherwise, block 24 ascertains if this agent's count of previous reassignments exceeds the limit Nmax in which case the agent is nonassignable, block 25. If the outcome of the decision block 24 is negative, then decision block 26 ascertains if the number of identical consecutive performance is less than NPmin. If yes, the agent is nonassignable, block 25. If not, then decision block 27 ascertains if the performance of this agent is 1, meaning satisfactory. If so, the agent is nonassignable. If not, decision block 28 determines if the performance exceeds 1 and UP flag is true. If the result is yes, then block 30 executes the upward assignment. If the result of block 28 is negative, then in block 29 a test is made of performance being less than 1, i.e., an inferior performance, and the DOWN flag being true. If the test is positive then downward assignment is made, block 31. If the result is negative then the agent is nonassignable, block 25. After completing the indicated reassignment or nonassignment, block 32 updates the counter to allow consideration of the next agent. Block 33 tests if all agents have been considered, which if true results in exit. If the result is negative, then flow goes to block 22 to test if Quota has already been met, as described earlier.

Figure 3:
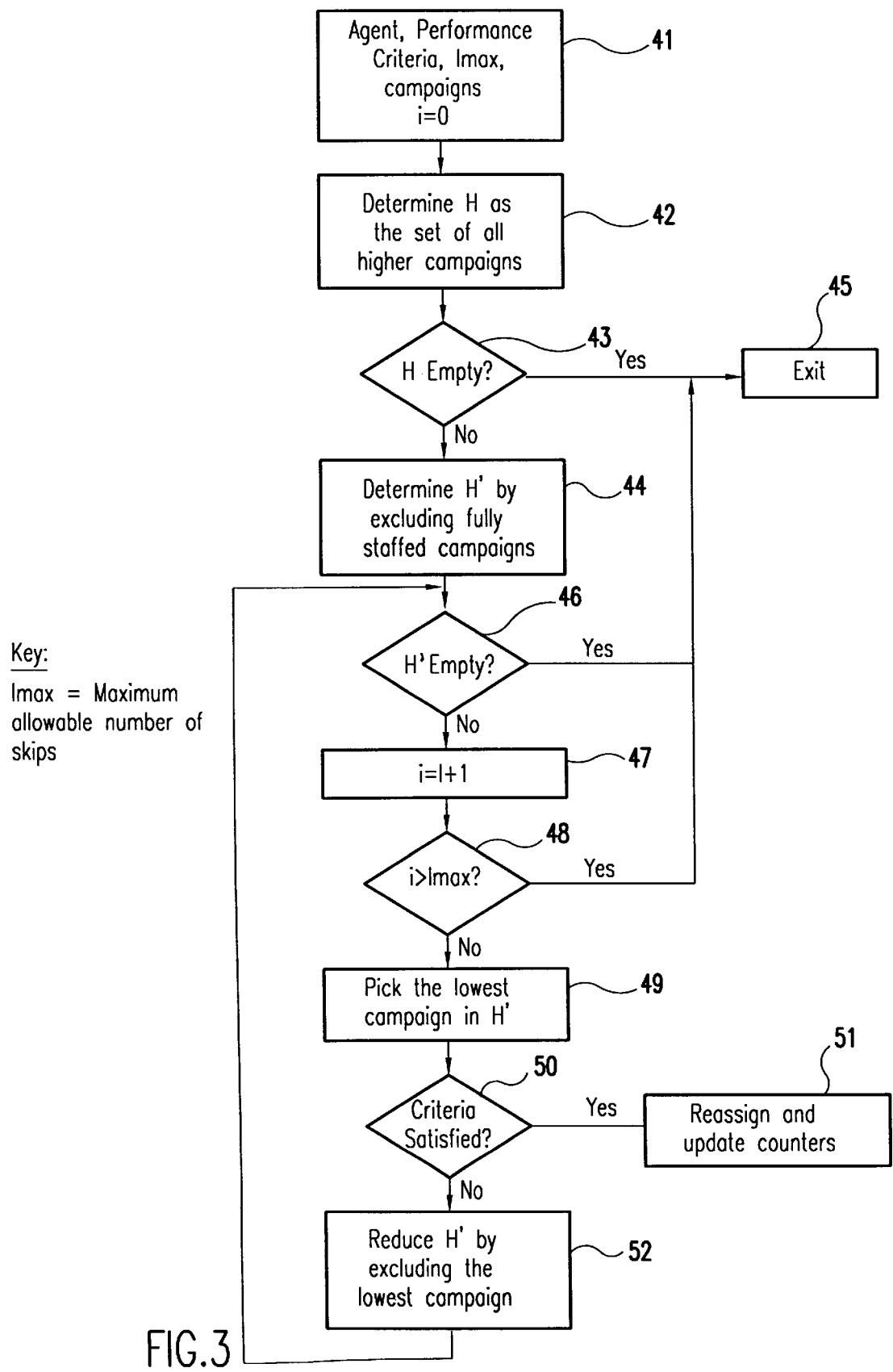
FIG. 3 shows a detailed flow diagram of reassigning an agent to a higher campaign.

FIG. 3 shows the details of upward assignment of an agent. One starts with block 41 with inputs about the agent, the performance, all the campaigns, any additional criteria to be met for reassignment, and Imax which is the maximum number of campaigns that can be skipped in the process of finding the right campaign to reassign this agent to. One starts with the skip counter set to zero. Block 42 determines H as the set of all campaigns higher than the campaign the agent is currently assigned to. Decision block 43 tests if H is empty in which case the subprocess exits, block 45, because there is no possible campaign for transferring this agent to. If H is non-empty, then in block 44 we exclude from H all campaigns that are fully staffed, and the resulting smaller set is named H'. Decision block 46 (very much like the block 43) tests if H' is empty in which case the subprocess exits, block 45. If H' is non-empty, then in block 47 the skip counter is incremented by 1, and decision block 48 tests if the skip counter exceeds the maximum allowable skips, Imax. If the counter exceeds Imax, then the subprocess exits; otherwise the lowest campaign in H' is selected as the candidate for reassignment, block 49. Next, in block 50 a test is made for criteria of reassignment being satisfied. An example of such criteria could be that the product of (expected) performance times the pay rate in the candidate campaign be greater than the similar product in the current campaign assignment by a certain percentage. If the criteria are met, then the agent is successfully assigned to the candidate campaign, block 51, and appropriate data are accordingly updated. If the criteria are not met, then H' is further reduced by excluding the campaign just considered, block 52. The flow then goes to the decision block 46 for testing if H' is empty, as explained earlier.

Figure 4:
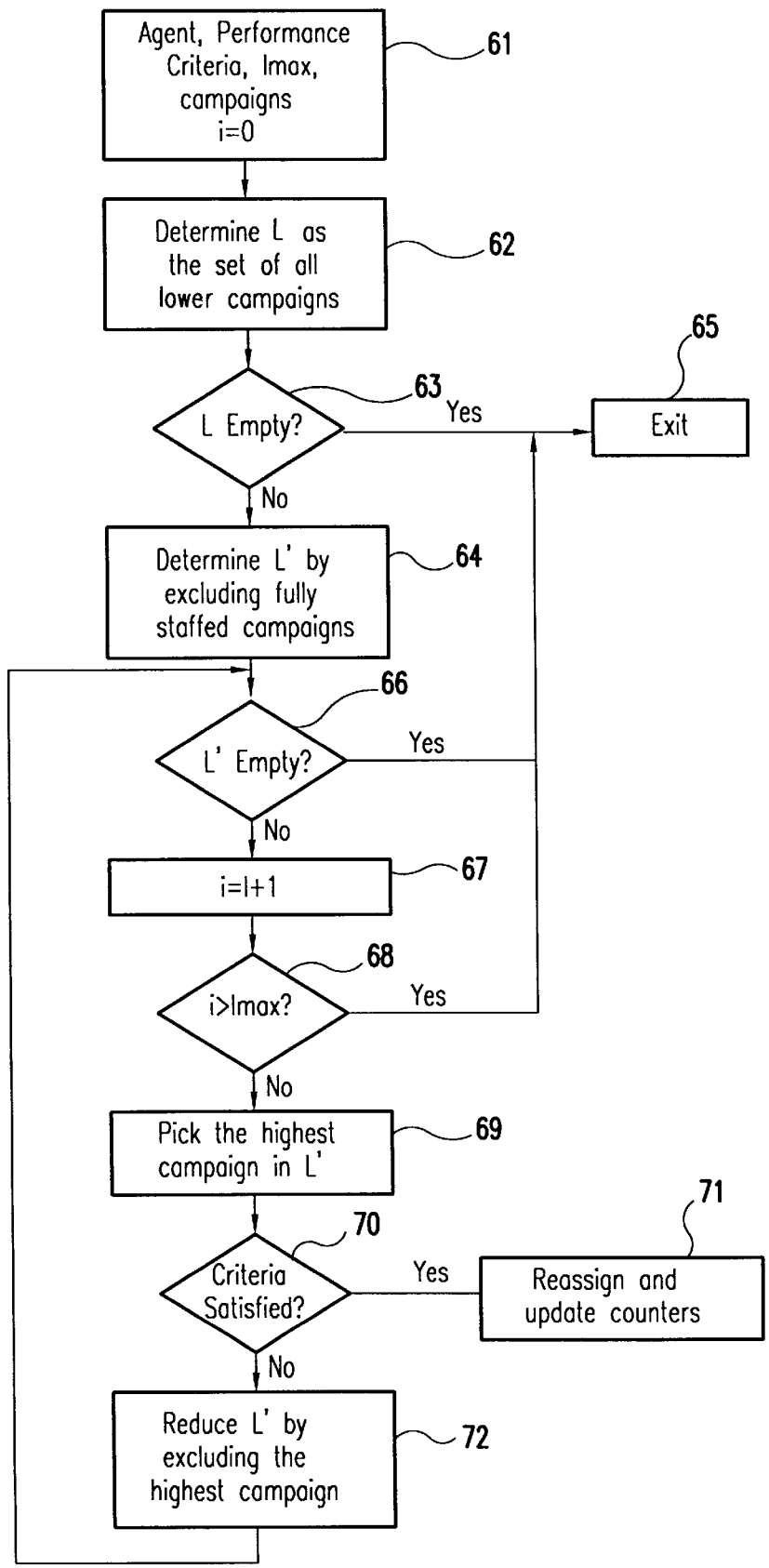
FIG. 4 shows the detailed flow diagram of reassigning an agent to a lower campaign.

FIG. 4 depicts an image of FIG. 3 for downward reassignment. One starts with the same input to block 61 as in block 41 of FIG. 3, namely, the information about the particular agent, associated performance, list of all campaigns, Imax, and the skip counter set to zero. Block 62 determines L as the set of all campaigns lower than the campaign the agent is currently assigned to. Decision block 63 tests if L is empty in which case the subprocess exits, block 65. If L is non-empty, the fully staffed campaigns are excluded and the resulting set is named L'. Block 66 tests if the L' is empty in which case the subprocess exits. If L' is non-empty, then the skip counter is incremented by 1 in block 67. Next the decision block 68 tests if the skip counter exceeds Imax in which the subprocess exits. If the counter is within limit of Imax, then one picks the highest campaign in L' as a candidate for reassigning this agent to, block 69. Block 70 tests for the satisfaction of criteria, as explained earlier in connection with FIG. 3. If criteria are met, then reassignment is made to the candidate campaign, block 71, and data are updated accordingly. If the criteria are not satisfied, then L' is reduced by excluding the candidate campaign, block 72. The flow then goes to block 66 to test if L' is empty, as described earlier.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer method for automatically reassigning agents engaged in a first call center campaign to a second call center campaign, which is running concurrently with said first call center campaign, based upon an agent's performance in said first call center campaign, including the steps of:

evaluating, during a performance interval, the performance of each of a plurality of agents engaged in said first campaign against a performance criteria for each respective agent in order to determine whether or not each agent exceeds the criteria; and transferring an agent engaged in said first call center campaign to said second call center campaign if said evaluating step determines performance of an agent exceeds said criteria.

2. A computer method for automatically reassigning agents engaged in a first call center campaign to a second call center campaign, which is running concurrently with said first call center campaign, based upon an agent's performance in said first call center campaign, including the steps of:

evaluating, during a performance interval, the performance of each of a plurality of agents engaged in said first campaign against a performance criteria for each respective agent in order to determine whether or not each agent exceeds the criteria;

inputting parameters to rank said first call center campaign and said second call center campaign;

transferring an agent engaged in said first call center campaign to said second call center campaign if, (a) said evaluating step determines performance of an agent exceeds said criteria and (b) the parameters of said second call center campaign relative to said first call center campaigns are appropriate to the transfer.

3. A computer method for automatically reassigning agents engaged in a first call center campaign to a second call center campaign, which is running concurrently with said first call center campaign, based upon an agent's performance in said first call center campaign, including the steps of:

evaluating, during a performance interval, the performance of each of a plurality of agents engaged in said first campaign against a performance criteria for each respective agent in order to determine whether or not each agent exceeds the criteria;

inputting parameters to rank said first call center campaign and said second call center campaign;

inputting a maximum staffing level for said second call center campaign;

tracking the number of agents assigned to said second call center campaign;

transferring an agent engaged in said first call center campaign to said second call center campaign if; (a) said evaluating step determines performance of an agent exceeds said criteria and (b) the parameters of said second call center campaign relative to said first call center campaign are appropriate to the transfer and; (c) the staffing level of said second call center campaign is less than the maximum staffing level.

4. A computer method for automatically reassigning agents engaged in a first call center campaign to a second call center campaign, which is running concurrently with said first call center campaign, based upon an agent's performance in said first call center campaign, including the steps of:

evaluating, during a performance interval, the performance of each of a plurality of agents engaged in said first campaign against a performance criteria for each respective agent in order to determine whether or not each agent exceeds the criteria;

inputting parameters to rank said first call center campaign and said second call center campaign;

inputting a maximum staffing level for said second call center campaign tracking the number of agents assigned to said second call center campaign;

inputting a minimum staffing level for said first call center campaign;

tracking the number of agents assigned to said first call center campaign;

transferring an agent engaged in said first call center campaign to said second call center campaign if; (a) said evaluating step determines performance of an agent exceeds said criteria and (b) the parameters of said second call center campaign relative to said first call center campaign are appropriate to the transfer and; (c) the staffing level of said second call center campaign is less than the maximum staffing level and (d) the number of agents assigned to said first campaign will exceed said minimum staffing level.

5. A computer method for automatically reassigning agents engaged in a first call center campaign to a second call center campaign, which is running concurrently with said first call center campaign, based upon an agent's performance in said first call center campaign, including the steps of:

evaluating, during a performance interval, the performance of each of a plurality of agents engaged in said first campaign against a performance criteria for each respective agent in order to determine whether or not each agent exceeds the criteria;

inputting parameters to rank said first call center campaign and said second call center campaign;

inputting a maximum staffing level for said second call center campaign;

tracking the number of agents assigned to said second call center campaign;

inputting a minimum staffing level for said first call center campaign;

tracking the number of agents assigned to said first call center campaign;

inputting a maximum number of agent transfers between call center campaigns within said performance interval;

tracking the total number of agent transfers between call center campaigns within said performance interval;

transferring an agent engaged in said first call center campaign to said second call center campaign if; (a) said evaluating step determines performance of an agent exceeds said criteria and (b) the parameters of said second call center campaign relative to said first call center campaign are appropriate to the transfer and; (c) the staffing level of said second call center campaign is less than the maximum staffing level and (d) the number of agents assigned to said first campaign will exceed said minimum staffing level and; (e) the total number of agent transfers is less than the maximum number of agent transfers.

6. A computer method for automatically reassigning agents engaged in a first call center campaign to a second call center campaign, which is running concurrently with said first call center campaign, based upon an agent's performance in said first call center campaign, including the steps of:

evaluating, during a performance interval, the performance of each of a plurality of agents engaged in said first campaign against a performance criteria for each respective agent in order to determine whether or not each agent exceeds the criteria;

inputting parameters to rank said first call center campaign and said second call center campaign;

inputting a maximum staffing level for said second call center campaign;

tracking the number of agents assigned to said second call center campaign;

inputting a minimum staffing level for said first call center campaign;

tracking the number of agents assigned to said first call center campaign;

inputting a maximum number of agent transfers between call center campaigns within said performance interval;

tracking the total number of agent transfers between call center campaigns within said performance interval;

inputting a maximum allowable number of reassignments for each agent during said performance interval;

tracking the number of reassignments of each agent;

transferring an agent engaged in said first call center campaign to said second call center campaign if; (a) said evaluating step determines performance of an agent exceeds said criteria and (b) the parameters of said second call center campaign relative to said first call center campaign are appropriate to the transfer and; (c) the staffing level of said second call center campaign is less than the maximum staffing level and (d) the number of agents assigned to said first campaign will exceed said minimum staffing level and; (e) the total number of agent transfers is less than the maximum number of agent transfers and; (f) the number of transfers of said agent is less than the maximum number of transfers.

7. A computer method for automatically reassigning agents engaged in a first call center campaign to a second call center campaign, which is running concurrently with said first call center campaign, based upon an agent's performance in said first call center campaign, including the steps of:

evaluating, during a performance interval, the performance of each of a plurality of agents engaged in said first campaign against a performance criteria for each respective agent in order to determine whether or not each agent exceeds the criteria;

inputting parameters to rank said first call center campaign and said second call center campaign;

inputting a maximum staffing level for said second call center campaign;

tracking the number of agents assigned to said second call center campaign;

inputting a minimum staffing level for said first call center campaign;

tracking the number of agents assigned to said first call center campaign;

inputting a maximum number of agent transfers between call center campaigns within said performance interval;

tracking the total number of agent transfers between call center campaigns within said performance interval;

inputting a maximum allowable number of reassignments for each agent during said performance interval;

tracking the number of reassignments of each agent;

inputting a minimum number of agent actions as a requirement for evaluating agent performance;

tracking the number of agent actions;

transferring an agent engaged in said first call center campaign to said second call center campaign if; (a) said evaluating step determines performance of an agent exceeds said criteria and (b) the parameters of said second call center campaign relative to said first call center campaign are appropriate to the transfer and; (c) the staffing level of said second call center campaign is less than the maximum staffing level and (d) the number of agents assigned to said first campaign will exceed said minimum staffing level and; (e) the total number of agent transfers is less than the maximum number of agent transfers and; (f) the number of transfers of said agent is less than the maximum number of transfers and; (g) the number of agent actions exceeds the minimum.

* * * * *